United States Patent [19]

Williams

[11] Patent Number: 4,525,132
[45] Date of Patent: Jun. 25, 1985

[54] MACHINE FOR MOLDING AND CURING A MASS OF RESILIENT MATERIAL

[76] Inventor: Rulon A. Williams, 3138 Jean St., Magna, Utah 84044

[21] Appl. No.: 548,668

[22] Filed: Nov. 4, 1983

[51] Int. Cl.³ .......................... B29H 5/02; B29C 5/00
[52] U.S. Cl. ..................................... 425/117; 425/37; 425/812; 425/577; 425/405 R; 425/457; 425/469; 249/184
[58] Field of Search ................. 425/28 R, 46, 812, 37, 425/117; 264/154, 102, 328.7, 318, 319, 250, 275

[56] References Cited

U.S. PATENT DOCUMENTS

| | | | |
|---|---|---|---|
| 1,394,589 | 10/1921 | Swinehart | 152/326 |
| 1,733,064 | 10/1929 | Lambert | 425/37 |
| 1,778,071 | 10/1930 | Fleiter | 425/37 X |
| 1,919,374 | 7/1933 | Leguillon | 264/102 |
| 2,745,459 | 5/1956 | Pennock | 152/153 |
| 3,096,541 | 7/1963 | Sindelar | 425/28 R |
| 3,124,842 | 3/1964 | Moormann | 264/154 |
| 3,170,188 | 2/1965 | Gollings | 425/28 R |
| 3,667,882 | 6/1972 | Ross | 425/117 |
| 3,734,566 | 5/1973 | Hanley | 301/6 CS |
| 4,095,637 | 6/1978 | Krishnan | 264/275 X |
| 4,201,744 | 5/1980 | Makinson | 264/250 |
| 4,420,297 | 12/1983 | Remon | 264/328.7 |

FOREIGN PATENT DOCUMENTS

| | | | |
|---|---|---|---|
| 1185758 | 8/1959 | France | 152/324 |
| 965269 | 7/1964 | United Kingdom | 425/40 |

Primary Examiner—J. Howard Flint, Jr.

[57] ABSTRACT

A machine for molding and curing a mass of resilient material into a desired shape in one operation and, if desired, bonding the resilient material to another material in the same operation; generally in the class of molded rubber or rubber-like goods and particularly in the class of self-cooling airless wheels for vehicles, which wheels contain holes that taper inwardly from the periphery of the tire to and/or through the rim. The machine is characterized by fin compressor boxes that impel fins into a mold cavity to cause a compressive reaction on resilient material therein, thereby expelling excess air from the mold through escape holes. An air passage may penetrate the fins for air or water to be circulated therethrough to aid in heating, cooling and/or curing the product. Withdrawal of fins from mold cavity permits easy removal of cured product.

1 Claim, 6 Drawing Figures

MACHINE FOR MOLDING AND CURING A MASS OF RESILIENT MATERIAL

BACKGROUND OF THE INVENTION

1. Field of the Invention

The invention pertains to a machine for molding and curing a mass of resilient material into a desired shape in one operation and, if desired, bonding the resilient material to another material in the same operation. The invention relates generally to a machine that molds various kinds and types of resilient material, such as rubbers, urethanes, plastics, and the likes, with the use of mechanical compression; and relates particularly to the manufacture of self-cooling airless wheels for automotive vehicles and the like as disclosed in my copending U.S. patent application Ser. No. 362,332 filed Mar. 26, 1982.

2. Description of Prior Art

In the manufacture of pressurized tires for automotive vehicles, water and/or air bags may be used in some procedures for a compressive action on resilient materials, such as rubber, conjunctively with an application of heat. In the manufacture of airless wheels it has been found to be impracticable to apply compression with the use of water and/or air bags. A widely used present means of manufacture is to mold a resilient material, such as rubber, to a rim as close as possible to the conformity of the cavity of a mold which, in another operation, will encompass and/or surround the resilient material and rim. Thereafter an application of heat enlarges the molecular volume of the mass of resilient material, and the compressive reaction expels excess air from the mold cavity. In the manufacture of airless wheels using a castable resilient material, such as urethanes, the material may be mixed with its catalyst and poured into a closed mold with heat applied, if desired, but usually the catalysis reaction suffices without supplemental heat and/or compression.

The methods and devices presently used in the manufacture of both pressurized tires and airless wheels are not feasible for the manufacture of airless wheels disclosed above as the wheels have tires that may be manufactured of various kinds and types of resilient materials and there are a multiplicity of holes penetrating each tire from its periphery to and/or through the rim, which holes are usually oval or rectangular in shape at the periphery of the tire and taper therefrom to smaller and more circular holes at and/or through the rim.

OBJECT OF THE INVENTION

A principal object of the invention is to overcome the impracticaility of applying compression by water and/or air bags to airless wheels during manufacture. The problem in manufacture caused by the holes in the airless wheels can be turned into an advantage because the shape of the holes will allow mechanical compression to be applied to resilient material within the mold cavity concurrently with curing and bonding the resilient material to a rim in one operation, and will permit easy removal of the mold from the periphery of the tire.

PRINCIPAL FEATURES OF THE INVENTION

Principal features of the invention include a cavity mold with a rim forming a part of the mold, and surrounding the mold is a series of fin compressor boxes comprised of fins attached to fin plates, power connectors, and appropriate guides.

Other advantages and features of the invention will become apparent from the following drawing and description which illustrate only one specific embodiment.

THE DRAWING

DESCRIPTION

Figures 1A, 1B:
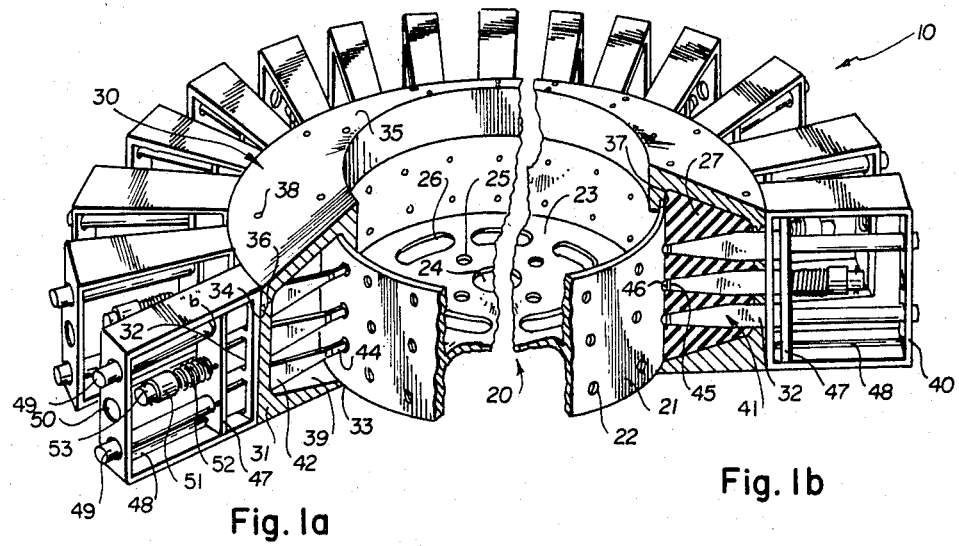
FIG. 1a is a cut-away perspective view of the molding machine.
FIG. 1b is a similar view showing fins in a different position.

Referring now in detail to the various views of the drawing, the machine 10 is shown with a wheel 20 comprised of rim 21, rim holes 22, center support 23, axle holes 24, lug bolt holes 25, air circulatory holes 26, and resilient material and/or tire 27. A mold, shown as 30, consists of rim 21; bottom mold 31, tread design holes 32, bottom mold rim seal 33, and bottom mold groove seal 34; top mold 35, top mold tongue seal 36, top mold rim seal 37, and air escape holes 38; and the cavity formed within mold 30 is shown as 39. Surrounding mold 30 is fin compressor box 40 with fin 41 composed of fin body 42, fin spring 43, retractable shaft 44, O ring and retainer 45, and rim seal 46; fin plate 47, fin plate bottom guide 48, fin plate guide rod 49, and guide rod holes 50; and power connector 51 with compensating spring 52 and retainer 53. Attached permanently to mold 30 is a variant of fin 41 shown as 41a. Also, fin 41 may be so constructed as to allow manipulation of fin bodies 42 and fin shafts 44 independently of each other.

Fins 41 are actuated by a power source, not shown, which is attached to power connectors 51. Various kinds of power may be used, such as motor and gear, hydraulic, conventional solenoid, levers, and the likes. One of the capabilities of a power source would be to station fins 41 in various positions within and outside of mold cavity 39 as described hereafter. It is obvious that power connectors 51 would vary in size and shape according to kind and type of power used. Also not shown herein, but may be referred to, are modes of heat application, modes of opening and closing mold 30, and modes of entering or injecting resilient material 27 into mold cavity 39, as the mechanics thereof are well known in the trade.

Rim 21 is manufactured to specifications to fit a particular vehicle or serve a particular purpose and is sandblasted and treated chemically for bonding to resilient material 27. A sheet of the same resilient material 27 may surround the periphery of rim 21 to seal rim holes 22 if desired. Tread design holes 32 in mold 30 may have gaskets inserted in them to retard leakage of resilient material 27 or to reduce friction with fins 41, if desired.

With mold 30 in open position and mold cavity 39 empty, the interior of mold 30 may be sprayed or otherwise treated with a chemical, such as silicone, to avoid coherence of resilient material 27 to mold 30. Fins 41 are then actuated into mold cavity 39 for similar anticoherence treatment, which treatment may not be required each time. Fins 41 are slightly withdrawn from mold cavity 39 to make clearance for insetion of rim 21 on bottom mold rim seal 33 in a certain position with the use of match marks, for example, to insure rim holes 22 and rim seals 40 are aligned.

With rim 21 in place, power connectors 51 are actuated to push fins 41 to a position in mold cavity 30 so that rim seals 46 close rim holes 22 with a slight amount of pressure and yet allow retractable shafts 44 to remain almost fully extended by pressure from fin springs 43. In this position, shown in FIG. 1a, fin bodies 42 have penetrated tread design holes 32 to a point on fin bodies 42 shown as "a" in FIG. 3, and fin bodies 42 are the same size from point "a" to their ends to effect closure of tread design holes 32 to retard leakage.

Now, a mass of resilient material 27, which may be pre-measured, pre-weighed, and/or pre-formed, such as coiled or ring-shaped, and in a pliable condition, may be placed in mold cavity 39. Or mold 30 may be closed and resilient material 27 may be injected into mold 30.

With mold 30 closed and resilient material 27 therein, the power connectors 51 are actuated to push fin bodies 42 further into mold cavity 39 to a position shown in FIG., 1b; and, due to compression of fin springs 43, shafts 44 retract into fin bodies 42. The displacement of smaller shafts 44 by a comparatively larger mass of fin bodies 42 compresses resilient material 27 and expels air from mold cavity 39 through air escape holes 38.

Retractable shafts 44 may have a hole through each center, much like tubing, to circumvent pressure and/or a vacuum that would interfere with free movement of shafts 44 within fin bodies 42; and, as delineated by lines at point "b" in fin body 42, the hole may be extended through fin body 42 and continue on through fin plate 47 and, if necessary, through guide 49. Such holes would also allow air or water to be circulated through fins 41 to aid in heating, cooling, and/or curing resilient material 27.

Figures 2, 3:
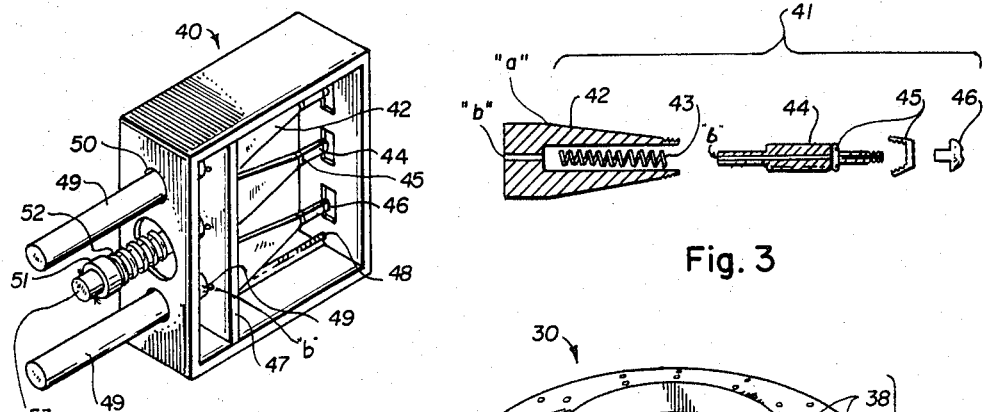
FIG. 2 is a perspective view of a fin compressor box.
FIG. 3 is an exploded perspective view of a rectractable fin.
Figure 4:
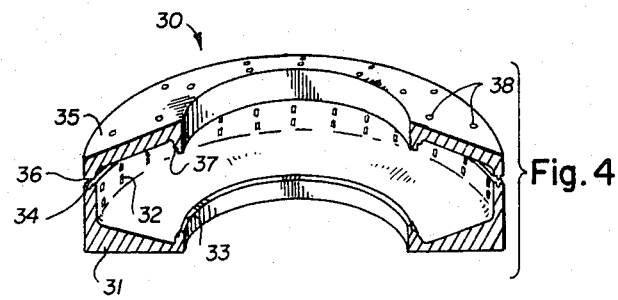
FIG. 4 is a cut-away perspective view of a mold without a rim.
Figure 5:
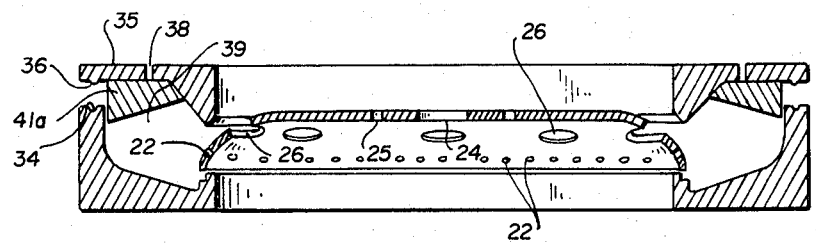
FIG. 5 is a cut-away perspective view of a mold with a half or dual rim.

When resilient material 27 is cured, power connectors 51 are actuated to withdraw fins 41 to a position outside of mold cavity 39 as shown in FIG. 2 with mold cavity 39 not shown. The finished product is removed by raising top mold 39, or it can be readily seen that bottom mold 31 can be made to open for bottom drop if desired.

The same mold may be used for castable resilient material 27; in which case, if no compression is desired, fins 41 may be positioned in mold cavity 39 as shown in FIG. 1b with fin shafts 44 retracted into fin bodies 42.

Rim 21 is always treated in known fashion for rim 21 and resilient material 27 to be bonded together; and the remainder of the interior of mold 39, including fins 41, is treated to avoid coherence with resilient material 27. After the respective treatments and prior to filling mold cavity 39, any place within the interior of mold 30 can be sprayed or treated with a sealant compatible with and suitable to become a part of a tire 27 if desired.

As shown in FIG. 3, fins 41 are comprised of fin body 42, fin spring 43, retractable shaft 44, O ring and retainer 45, and rim seal 46; and are attached to fin plate 47 which may travel on bottom guide 48. Guides 49 are attached on opposite sides of fin plate 47 which guides 49 travel through guide holes 50. Power connector 51 and spring 52 move freely on a guide rod 49 and are retained thereon by retainer 53. Free movement of power connector 51, resisted by spring 52, allows variation in the force, movement and position of fins 41, particularly if mold cavity 39 is slightly overfilled with resilient material 27. Also, spring 52 compensates for air expelled during the early stage of the curing process.

It is understood the present disclosure is by way of example and variations are possible without departing from the subject matter coming within the scope of the following claims, which subject matter I regard as my invention.

I claim:

1. A machine for molding and curing a mass of resilient material into a desired shape in one operation and bonding the resilient material to an insert material in the same operation, said machine comprises: a mold having a cavity surrounded by a series of fin compressor box means each having a plurality of fins operable to extend inwardly into said mold cavity and upon completion of the curing process of the resilient material to be withdrawn from said mold cavity to permit easy removal of the finished product from said mold cavity, said mold having a closure top; compensating spring means in the fin box means for allowing a variance in the movement of the fins; and air escape holes in said mold cavity wall to allow air in said mold cavity to be ejected therefrom; each of said fins comprising a fin body having a recess in the inner end, a fin spring in said recess, a retractable shaft in said recess, a retainer O ring on said shaft, and a rim seal on said shaft, said retractable shafted being telescope into said recess of said fin body when the rim seal in tandem with the retractable shaft is pushed against and meets resistance against a section of said mold cavity wall as the fins are actuated into said mold cavity, actuating means for telescoping said fins resulting in a larger mass of fin bodies displacing a smaller mass of retractable shafts within said closed mold cavity after said mold cavity is filled with said resilient material whereby excess air is forcably ejected from said mold cavity permitting the resilient material to fill the voids in said mold cavity from the pressure caused by said displacing fin bodies; each said fin body further having an air passage therethrough in its outer end so that air circulates freely through said fin bodies to avoid the build-up of a differential pressure therein that would hinder the intended movement of the fins and so that a fluid of a controlled temperature can be circulated through said air passage to aid in heating and cooling the resilient material to be cured.

* * * * *